(12) United States Patent
Minnich

(10) Patent No.: US 6,811,363 B1
(45) Date of Patent: Nov. 2, 2004

(54) FLOATING CAGE NUT ASSEMBLY

(75) Inventor: Kerry S. Minnich, Pine Grove, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/372,216

(22) Filed: Feb. 25, 2003

(51) Int. Cl.⁷ .......................... F16B 37/00; F16B 39/10
(52) U.S. Cl. ...................... 411/104; 411/112; 411/120; 411/999
(58) Field of Search ................................. 411/104, 111, 411/112, 113, 119, 120, 121, 171, 999

(56) References Cited

U.S. PATENT DOCUMENTS

| | | | |
|---|---|---|---|
| 2,477,429 A | | 7/1949 | Swanstrom et al. |
| 4,193,435 A | | 3/1980 | Charles et al. |
| 4,830,557 A | * | 5/1989 | Harris et al. ............ 411/112 X |
| 4,875,816 A | | 10/1989 | Peterson |
| 5,193,868 A | | 3/1993 | O'Toole |
| 5,558,369 A | | 9/1996 | Cornea et al. |
| 5,630,686 A | * | 5/1997 | Billmann ................. 411/113 X |
| 5,971,686 A | * | 10/1999 | Stewart et al. .......... 411/113 X |
| 6,027,293 A | * | 2/2000 | Beemer et al. ............. 411/119 |

* cited by examiner

Primary Examiner—Neill Wilson
(74) Attorney, Agent, or Firm—Liniak, Berenato & White

(57) ABSTRACT

A floating and captured cage nut assembly includes a structural member that is U-shaped with a pair of rolled sides defining mounting legs and a rolled front end defining an anti-rotation flange. The rolled sides of the structural member are positioned on the component and are welded or otherwise secured thereto over the opening during manufacture. The floating and captured cage nut assembly further includes an anti-rotation plate having a hexagonal opening to receive a flange nut and a locking window. The anti-rotation plate and the flange nut are inserted within the structural member and the anti-rotation flange is received within the locking window with clearance to loosely secure the components together. The flange nut is retained on the component, and the anti-rotation plate prevents its rotation. The clearance between the anti-rotation flange and the locking window facilitates the threading of the fastener into the nut within a predetermined tolerance zone.

9 Claims, 4 Drawing Sheets

FLOATING CAGE NUT ASSEMBLY

BACKGROUND OF THE INVENTION

1. Field of the Invention

The present invention relates to caged and floating fasteners adapted to be mounted on structural products.

2. Background of the Invention

Vehicle suspension and full-frame/cradle assemblies are composed of a variety of components. Frequently, an article is secured to one of such components by one or more threaded fastener and nut assemblies. To accomplish this, aligned apertures are formed through the article and the component. Such apertures are aligned with one another, and a threaded fastener is inserted therethrough. A nut is then threaded onto the end of the fastener to secure the article to the component. In some instances, a lack of clearance can make installation of the nut onto the end of the threaded component somewhat difficult.

Caged and floating fasteners-such as-caged nuts are frequently used in the manufacture of automobiles and other goods. A caged nut generally comprises a nut encaged in a structure that allows access to the nut bore, and provides the nut with a limited range of movement within the cage. In the manufacture of automobiles using caged nuts, the cage is welded onto the frame of the automobile and provides a nut at a selected location for the attachment of another part, such as a door to the frame or a bracket to another structural component. The range of movement of the nut in the cage is provided so that the part being mounted on the frame may be adjusted relative to the frame during final assembly.

A caged nut provides advantages in that it can be assembled into a product framework during manufacture, so that the number of operations required in the final assembly of the product are reduced. In addition, a caged nut can be attached to the framework in locations which subsequently become enclosed or tightly circumscribed as more parts are assembled onto the product. If a caged nut was not provided in such situations, it would be very difficult to locate a nut by hand to receive a bolt used to fasten components such as a door onto a vehicle frame. The caged nut also eliminates the need for a backing tool such as a wrench or a socket to provide counter torque. In the usual practice in the automotive industry, the caged nut is spot welded on the frame; however, the conventional cage nut assemblies fail to provide necessary tolerance zones.

The need thus exists for a cage nut assembly that is easy to assembly and locate while providing necessary tolerance zones.

SUMMARY OF THE INVENTION

The present invention contemplates that a captured nut assembly be provided on a vehicle component during manufacture, allowing the threaded fastener to be threaded into the nut quickly and easily at a later date.

In the preferred embodiment, the captures cage nut assembly includes a support member that is generally flat and U-shaped with a pair of rolled sides defining mounting legs and a rolled front end defining an anti-rotation flange. The rolled sides of the support member are positioned on the component and are welded or otherwise secured thereto over the opening during manufacture. The captured cage nut assembly further includes an anti-rotation plate having a hexagonal opening and a locking window formed therethrough. The hexagonal opening is sized to receive a flange nut therein. The anti-rotation plate and the flange nut can be inserted within the support member such that the anti-rotation flange is received within the locking window with clearance to loosely secure the components together. As a result, the flange nut is retained on the component for later use. When a threaded fastener is threaded into the nut, the anti-rotation plate prevents rotation of the nut. The clearance between the anti-rotation flange and the locking window facilitates the threading of the threaded fastener into the nut within a suitable, predetermined tolerance zone.

Other benefits, aspects and features of the present invention in addition to those mentioned above will be pointed out in or will be understood from the following detailed description provided in conjunction with the accompanying drawings.

DESCRIPTION OF THE PREFERRED EMBODIMENT

Figure 1:
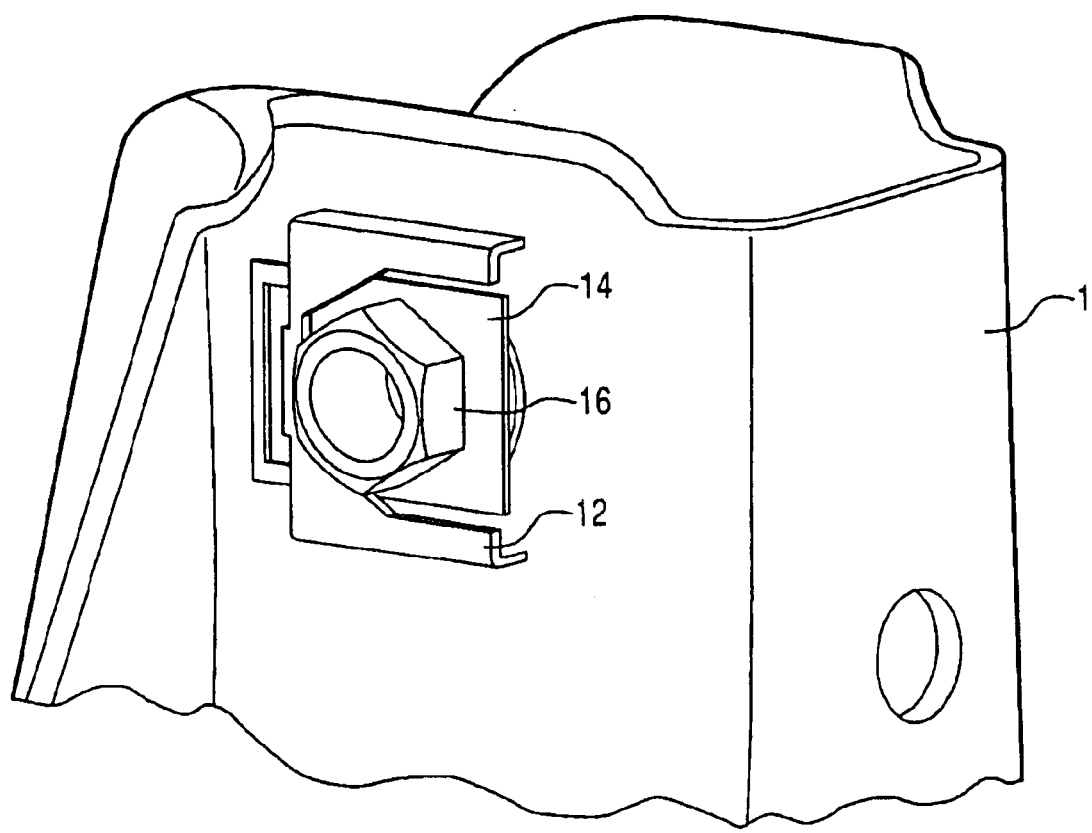
FIG. 1 is a perspective view of an embodiment of a caged fastener of the present invention mounted to an upper control arm bracket.

With reference to FIG. 1, a caged fastener adapted to be mounted in a structural component (e.g., an upper control arm bracket 1) is shown generally. The caged fastener 10 comprises a support member 12, an anti-rotation plate 14, and a flange nut 16.

Figure 4:
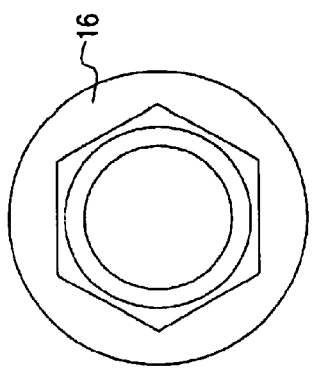
FIG. 4 is a top plan view of the flange nut 16 of FIG. 1.
Figure 3:
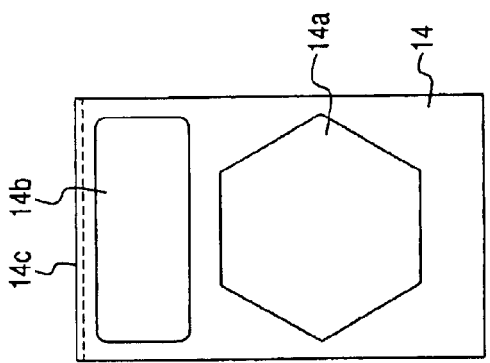
FIG. 3 is a top plan view of the anti-rotation plate 14 of FIG. 1.
Figure 2:
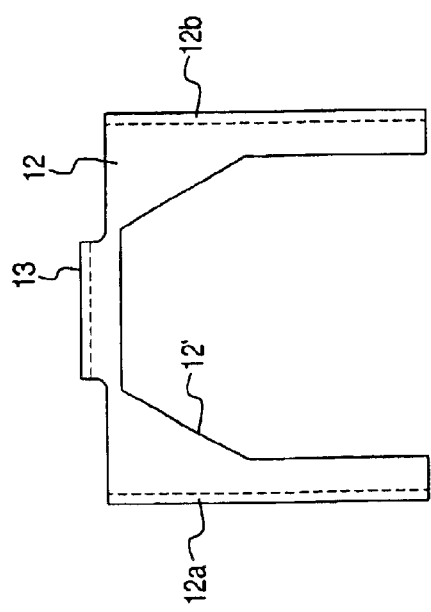
FIG. 2 is a top plan view of the support member 12 of FIG. 1.

With reference to FIG. 2, the support member 12 is generally flat and shaped to define a U-shaped edge 12' with a pair of rolled sides defining mounting legs 12a, 12b and a rolled front end defining an anti-rotation flange 13. The captured cage nut assembly further includes an anti-rotation plate 14 having a hexagonal opening 14a and a locking window 14b formed therethrough as shown in FIG. 3. The hexagonal opening 14a is sized to receive the flange nut 16 therein. The flange nut 16 is illustrated in FIG. 4.

Figure 5:
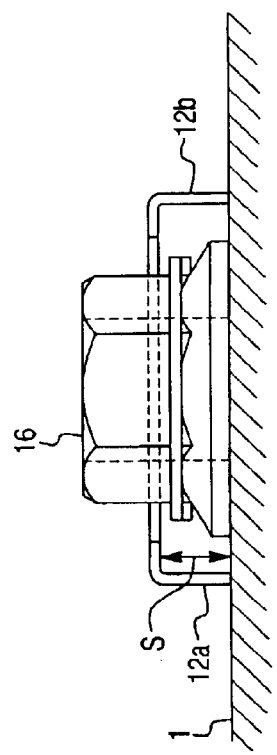
FIG. 5 is a detailed side view of the cage nut assembly of FIG. 1.

During assembly and manufacture of the vehicle component, the support member 12 is positioned with the rolled sides 12a, 12b of the support member 12 welded or otherwise secured to the component 1 after the fastener holes are perforated during manufacture (see FIG. 5). The anti-rotation plate 14 and flange nut 16 are assembled in a separate sub-assembly process, for example, the flange nut 16 may be inserted into the hexagonal opening 14a and tack welded in place to the anti-rotation plate 14.

After the fastener holes are perforated, the operator can install the anti-rotation plate 14 and the flange nut 16 within the support member 12. The mounting legs 12a, 12b of the support member 12 are sized to create a predetermined spacing 'S' to receive the anti-rotation plate 14 and flange nut 16 (see FIG. 5).

Figure 6A:
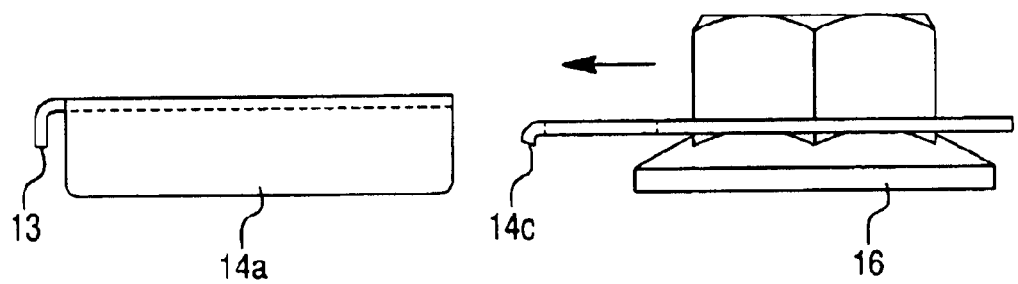
FIGS. 6a–6c show three progressive assembly steps for the cage nut assembly of the present invention.
Figure 6B:
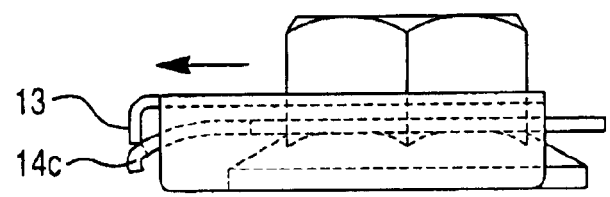
Figure 6C:
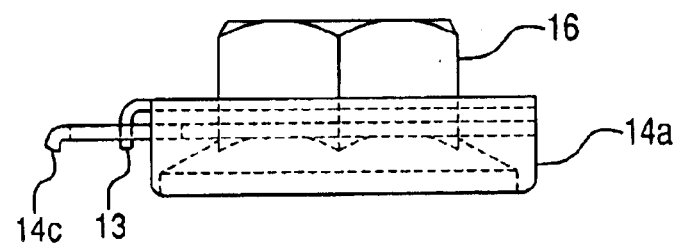
Figure 7:
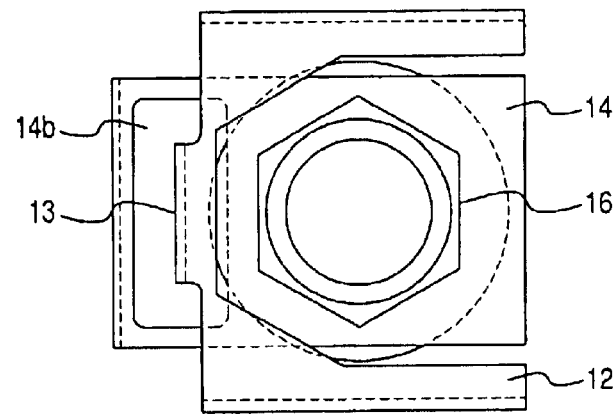
FIG. 7 is a top plan view of the cage nut assembly of this invention in an assembled state.
Figure 8:
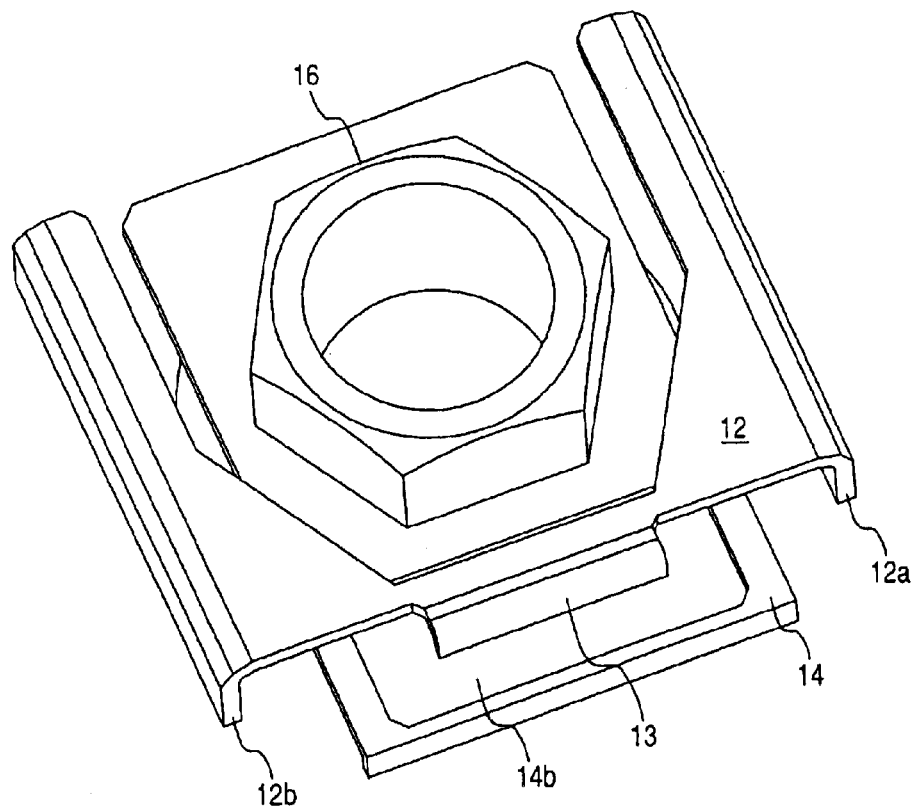
FIG. 8 is a perspective view of the cage nut assembly of FIG. 7.

Installation of the anti-rotation plate 14 and flange nut 16 to the support plate, that has been welded to a substrate, is shown in FIGS. 6a–6c. To install the anti-rotation plate 14 and flange nut 16, the operator slides the plate 14 and nut 16 such that the hexagonal nut abuts the U-shaped edge 12' of the support plate 12, and the anti-rotation flange 13 is received within the locking window 14b with clearance to loosely secure the components together. To facilitate insertion of the anti-rotation plate 14, the leading edge 14c is turned down or rolled so that the leading edge 14c is initially deflected downwardly by the anti-rotation flange 13 as the anti-rotation plate is inserted into the support member 12.

As a result, the flange nut is retained on the component for later use. When a threaded fastener is threaded into the flange nut 16, the anti-rotation plate 14 prevents rotation of the nut 16. The clearance between the anti-rotation flange 13 and the locking window 12b facilitates the threading of the threaded fastener into the nut 16 within a suitable, predetermined tolerance zone.

In the preferred embodiment as it applied to vehicle frame components, the present invention allows a floating nut of +/−4 mm to be installed on the vehicle frame for use by the customer at final assembly. Also, the invention enables the customer to meet the required torque specifications of the assembly process.

The cage nut assembly allows the nut to stay in place during the shipping process to the customer and the customer can then install an eccentric p-point bolt to pick up the floating nut during the installation of additional frame components; e.g., the upper control arm.

It is to be appreciated that the structural member 1 shown and described is merely exemplary of the kinds of structures in which the caged fastener of the present invention may be mounted, and such structures may include all other shapes which provide surfaces for a frictional fit of the holding members to mount the caged fastener, and may, for example, include channels, spaced apart members, or any other appropriately sized and adapted structure.

It is to be appreciated that the disclosure and drawings are not limiting, as the particular shape of the body 1 and the cage assembly may be varied to meet the particular size or shape of an available nut chamber in which it is to be mounted, based on the principle of a snap mounted caged fastener which is held in place by an interlocking fit which is effected by the flange 13 and locking window 12b. The orientation and the arrangement of the various elements, particularly the structural members, may be adapted to particular needs all in accordance with the invention. As such, one of ordinary skill in the art would understand that various changes in form and detail may be made to the foregoing description and drawings without departing from the spirit and scope of this invention.

I claim:

1. A floating and caged fastener, comprising:

a structural member having a U-shaped opening, a pair of sides defining mounting legs, and a front end defining an anti-rotation flange;

an anti-rotation plate having a geometric opening and a locking window formed therethrough to receive said anti-rotation flange;

a flange nut sized to fit within said geometric opening, wherein said mounting legs are adapted to be affixed to a frame member with said anti-rotation plate being seated between said mounting legs and said flange nut being seated within said U-shaped opening, and wherein said anti-rotation flange prevents rotation of said flange nut relative to said structural member.

2. A floating and caged fastener in accordance with claim 1, wherein said front end is disposed within said locking window when said anti-rotation plate is seated between said mounting legs and said flange nut is seated within said U-shaped opening.

3. A floating and caged fastener in accordance with claim 2, wherein the anti-rotation flange is received within the locking window with clearance to loosely secure the anti-rotation plate to the structural member, whereby the flange nut is retained on the frame member for later use.

4. A floating and caged fastener in accordance with claim 2, wherein when a threaded fastener is threaded into the nut, the anti-rotation plate prevents rotation of the nut.

5. A floating and caged fastener in accordance with claim 4, wherein a clearance between the anti-rotation flange and the locking window facilitates the threading of the threaded fastener into the nut within a suitable, predetermined tolerance zone.

6. A floating and caged fastener in accordance with claim 1, wherein, during assembly, the sides of the structural member are positioned on the frame member and are welded over an opening in the frame member.

7. A floating and caged fastener in accordance with claim 1, wherein said flange nut comprises a threaded bore.

8. A floating and caged fastener in accordance with claim 1, wherein said anti-rotation plate comprises a front edge having a curved shape to facilitate assembly of said anti-rotation plate with respect to said structural member.

9. A floating and caged fastener in accordance with claim 8, wherein, during assembly, said front edge of said anti-rotation plate abuts said anti-rotational flange and causes said anti-rotation plate to deflect away from said structural member.

* * * * *